United States Patent

Grubb

[15] 3,647,467

[45] Mar. 7, 1972

[54] HEXAARYLBIIMIDAZOLE-HETEROCYCLIC COMPOUND COMPOSITIONS

[72] Inventor: Eugene L. Grubb, Wilmington, Del.

[73] Assignee: E. I. du Pont de Nemours and Company, Wilmington, Del.

[22] Filed: May 22, 1969

[21] Appl. No.: 827,072

[52] U.S. Cl. ....................96/90, 96/88, 96/115

[51] Int. Cl. ....................G03c 1/72, G03c 1/68

[58] Field of Search ....................96/88, 90, 115

[56] References Cited

UNITED STATES PATENTS 3,390,994 7/1968 Cescon ....................96/48

3,390,996 7/1968 MacLachlan ....................96/48

3,390,997 7/1968 Read ....................96/48

OTHER PUBLICATIONS

Chemical Abstracts Vol. 58, 7512c, April 1963, QD1A51c2.

*Primary Examiner*—Norman G. Torchin
*Assistant Examiner*—Richard E. Fichter
*Attorney*—Gary A. Samuels

[57] ABSTRACT

Photoactivatable compositions comprising a hexaarylbiimidazole and a heterocyclic compound of the formula $Ar^1$—G—$Ar^2$ where $Ar^1$ is aryl of six to 12 nuclear carbons, $Ar^2$ is $Ar^1$ or arylene—G—$Ar^1$ and G is a divalent furan, oxazole or oxadiazole ring, and optionally, a leuco dye and/or a polymerizable monomer or inert components such as binders, solvents, and the like. The compositions are photoactivated in the near ultraviolet or visible light wavelengths.

35 Claims, No Drawings

HEXAARYLBIIMIDAZOLE-HETEROCYCLIC COMPOUND COMPOSITIONS

BACKGROUND OF THE INVENTION

1. Field of the Invention

This invention relates to light-sensitive phototropic compositions and imaging systems. More specifically, this invention is directed to photodissociable hexaarylbiimidazoles in combination with selected heterocyclic compounds that absorb in the near ultraviolet light wavelengths.

2. Description of the Prior Art

Hexaarylbiimidazoles dissociate upon exposure to ultraviolet light to form stable colored triarylimidazolyl radicals useful as light screens as described in British Pat. No. 997,396, published July 7, 1965. Such dissociation is useful in hexaarylbiimidazole/leuco dye compositions, for the triarylimidazolyl radical, formed as described above, oxidizes the leuco form of the dye to the colored form. Thus, colored images are obtained making the compositions useful in imaging applications, as described in British Pat. No. 1,047,569, published Nov. 9, 1966. However, the hexaarylbiimidazoles in general absorb largely and maximally at ultraviolet (UV) wavelengths below 300 mμ and to some much lesser extent at wavelengths as high as 430 mμ. Thus, while any of the imaging compositions described above containing the hexaarylbiimidazole are sensitive to radiation over substantially the whole UV range, they respond most efficiently to radiation that corresponds to or substantially overlaps the region of maximum absorption. It is not always practical to irradiate fully into this region. For example, in some imaging applications, it is desired to cover the photosensitive hexaarylbiimidazole-leuco dye imaging composition with a transparent film. Some film materials, such as "Mylar" and "Cronar" commercial polyesters, otherwise s$itable, are not transparent below 300 mμ, and thus prevent such short wavelength activating radiation from reaching the biimidazole, with consequent loss in efficiency.

Further, many commercially important ultraviolet sources, such as cathode-ray tubes widely useful in imaging deices that convert electrical to light energy and transmit such light as images to photosensitive surfaces (plates, papers, films), emit mainly in the near ultraviolet and above, owing in part to limitations in the available phosphors and in part to the screening by the fiber optic face plate of radiation below 300 mμ. Thus, imaging with such radiation sources is not entirely satisfactory as to the imaging speeds and optical densities that the hexaarylbiimidazole/leuco dye systems can inherently provide.

Thus, as the activating radiation contains increasing proportions of visible components or as components closer to the UV region are filtered out, hexaarylbiimidazole photolysis, hence color formation from leuco dye, becomes less efficient as to the amount of energy utilized and the optical quality of the image produced.

The present invention overcomes these deficiencies by enhancing the efficiency of the imaging systems described above in the near ultraviolet light region of absorption through the use of selected heterocyclic sensitizers.

SUMMARY OF THE INVENTION

This invention is directed to a photoactivatible composition comprising an admixture of A. a hexaarylbiimidazole that has its principal light absorption bands in the ultraviolet region of the electromagnetic radiation spectrum and is dissociable to triarylimidazolyl radicals on irradiation with such absorbable ultraviolet light, and B. a heterocyclic compound of the formula $Ar^1$-G-$Ar^2$ wherein $Ar^1$ is an aryl group of six to 12 nuclear carbon atoms, $Ar^2$ is $Ar^1$ or an arylene-G-$Ar^1$ group wherein the arylene has six to 10 nuclear carbon atoms, and G is a divalent furan, oxazole or oxadiazole ring, and which has its principal light absorption in the near ultraviolet or visible regions of the electromagnetic radiation spectrum, and, optionally C. a leuco dye that is oxidizable to dye by triarylimidazolyl radicals and/or an addition-polymerizable, ethylenically unsaturated monomer.

The invention is also directed to processes for irradiating the foregoing compositions.

DESCRIPTION OF THE INVENTION

This invention is based on the surprising discovery that heterocyclic compounds as defined, which absorb light at longer wavelengths (between about 290 and 420 mμ) than the hexaarylbiimidazoles (maximum absorption between about 235–285 mμ) can transfer such absorbed long wavelength light energy to the hexaarylbiimidazoles, i.e., the heterocyclic compounds can sensitize the hexaarylbiimidazole, thus converting it to the triarylimidazolyl radical. By thus extending the spectral sensitivity of the hexaarylbiimidazoles to wavelengths they do not normally absorb or absorb only weakly, the heterocyclic compounds significantly enhance their utility as light screens and photooxidants.

While the sensitization mechanism is not known with certainty, it is considered that when compositions of this invention are irradiated with light rich in near ultraviolet wavelengths, the heterocyclic compounds absorb the light and are activated to at least one excited energy transfer state. In such activated state they transfer absorbed energy to the hexaarylbiimidazole, for example through collision or resonance interaction and return to the ground state, becoming available again for activation. The thus-indirectly-activated hexaarylbiimidazole dissociates into triarylimidazolyl radicals.

The subsequent fate of the inherently colored and energy-rich imidazolyl radicals and their utilization in accordance with the various embodiments of this invention depends on the substantial absence or presence of other substances that are reactive towards the radicals. Thus in formulating light screens or windows containing hexaarylbiimidazole/heterocyclic compound compositions, there will usually be employed components such as solvents and binders, as described by Cescon British Pat. No. 997,396, that are substantially inert, i.e., resistant, to oxidation by the imidazolyl radicals.

In such an embodiment the process manifests itself as a color change, attributable to formation of the inherently colored triarylimidazolyl radical (L·). When the light source is removed, the color fades as the radicals dimerize, thus regenerating hexaarylbiimidazole (LL), as follows:

$$(1) \qquad 2L\cdot \rightarrow LL$$

The imidazolyl radicals are useful oxidants, as schematically illustrated in equation 2

$$(2) \qquad 2L\cdot + DH + H^+ \rightarrow 2\,LH + D^+$$

where DH for example is an oxidizable substance such as a leuco dye, $D^+$ is the oxidation produce (dye), and LH is the reduction product (triarylimidazole).

Thus the hexaarylbiimidazole/heterocyclic compound combinations are particularly useful as visible light actuated photooxidants for a variety of substrates, including leuco dyes, and the hexaarylbiimidazole/heterocyclic compound/leuco dye combinations constitute the basic ingredients of visible light actuated imaging systems, as more fully described below.

The Heterocyclic Compound (Sensitizer)

The substituents in the furans, oxazoles and oxadiazole heterocyclic compounds defined are not critical provided the compound has the desired spectral properties described below. Preferably $Ar^1$ and $Ar^2$ are in the 2,5-positions of the heterocycles. In general, the substituents are chosen such that the heterocyclic sensitizer absorb substantially in the 290 to 420 mμ range, preferably above 300 mμ, as measured in an inert solvent such as benzene, toluene, tetrahydrofuran, dioxane, or the like hydrocarbon or ether solvent.

The heterocyclic compounds characteristically have desirable high extinction coefficients at the wavelengths of maximum absorption, normally at least 15,000, and often 20,000 or more. The higher the extinction coefficient the better, since more energy is available for transfer to the biimidazole.

Preferably the heterocyclic compounds have the formula

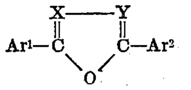

wherein $Ar^1$ and $Ar^2$ are defined above. When both X and Y are alkylidynes, which normally are C-H, C-Me or C-Et radicals, the heterocyclic compound is a furan. When one of X and Y is nitrogen, it is an oxazole, and when both X and Y are nitrogen, it is an oxadiazole. Preferably the group X—Y is C(R)—C(R)

where each R is hydrogen or alkyl of one to two carbons (most preferably hydrogen), N—C—H or N—N In general, $Ar^1$ may be phenyl, biphenylyl, naphthyl or such aryl bearing one or more inert substituents, i.e., groups that do not adversely affect the desired spectral characteristics, such as lower alkyl and aralkyl groups exemplified by methyl, ethyl, propyl butyl, benzyl, p-methylbenzyl and the like benzyls substituted with lower alkyl groups. The arylene groups of the arylene-G-$Ar^1$ radicals are preferably 1,4-phenylene or 1,4-naphthylene but may be a similar bridging aromatic hydrocarbon diradical such as 1,3-phenylene, 2-methyl-1,4-phenylene and 1,5-naphthylene.

Representative heterocyclic compounds include 2,5-diphenylfuran, 2,5-diphenyl-3,4-dimethylfuran, 2,5-diphenyl-3-ethylfuran, 2,5-di-(p-methylphenyl)furan, 2,5-di-(p-2,4-dimethylphenyl)furan, 2,5-di(p-butylphenyl)furan, 2,5-di(p-benzylphenyl)furan, 2-phenyl-5-(p-biphenylyl)furan, 2,5-di(p-biphenylyl)furan, 2-phenyl-5-(alpha-naphthyl)furan; 2,5-diphenyloxazole, 2,5-diphenyl-3-methyloxazole, 2,5-di(p-isopropylphenyl)oxazole, 1,4-bis[2-(5-phenyloxazolyl)]benzene, 1,4-bis]2-(4-methyl-5-phenyloxazolyl)] benzene, 2-phenyl-5-(p-biphenylyl)oxazole, 2-phenyl-5(alpha-naphthyl)oxazole, 2,5-di(alpha-naphthyl)oxazole, 1,4-bis[2-(5-phenyloxazolyl)]naphthalene; 2,5-di(alphanaphthyl)-1,3,4-oxadiazole, 2-phenyl-5-(alpha-naphthyl)-1,3,4-oxadiazole, 2,5-di(p-tert.butylphenyl)-1,3,4-oxadiazole, 2,5-di(4-methyl-1-naphthyl)-1,3,4-oxadiazole, 2-phenyl-5-(p-biphenylyl)-1,3,4,-oxadiazole, 1,4-bis[2-(5-phenyl-1,3,4-oxadiazolyl)]benzene.

The quantity of the heterocyclic sensitizer used will vary depending on the particular sensitizer's extinction coefficient, its efficiency in transferring the absorbed energy to the hexaarylbiimidazole, and the effect desired. Practically speaking, it will be present in normal sensitizing amounts. These amounts can be determined such that the optical density (directly proportional to the product of the extinction coefficient and the concentration) of the sensitizer is greater than the biimidazole's at at least one wavelength within the chosen exposure range. It will be appreciated that even though the biimidazole itself may absorb to some extent at such wavelengths, the effect of the heterocyclic sensitizer is to substantially and significantly increase the composition's total absorption of usable light during the exposure for the intended purpose. In general, the actual quantity of sensitizer employed will range from about 0.001 to 1 mole per mole biimidazole, more usually between about 0.01 and 0.5 mole per mole.

The Hexaarylbiimidazole

These are 2,2', 4,4', 5,5'-hexaarylbiimidazoles, sometimes called 2,4,5-triarylimidazolyl dimers which are photodissociable to the corresponding triarylimidazolyl radicals. These hexaarylbiimidazoles absorb maximally in the 255–275 mμ region, and usually show some, though lesser absorption in the 300–375 mμ region. Although the absorption bands tend to tail out to include wavelengths as high as about 420 mμ, they thus normally require light rich in the 255–375 mμ wavelengths for their dissociation.

The hexaarylbiimidazoles can be represented by the formula

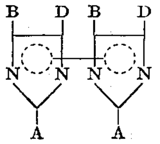

wherein A, B and D represent aryl groups which can be the same or different, carbocyclic or heterocyclic, unsubstituted or substituted with substituents that do not interfere with the dissociation of the hexaarylbiimidazole to the triarylimidazolyl radical or with the oxidation of the leuco dye, and each dotted circle stands for four delocalized electrons (i.e., two conjugated double bonds) which satisfy the valences of the carbon and nitrogen atoms of the imidazolyl ring. The B and D aryl groups can be substituted with 0-3 substituents and the A aryl groups can be substituted with 0-4 substituents.

The aryl groups include one- and two-ring aryls, such as phenyl, biphenyl, naphthyl, pyridyl, furyl and thienyl. Suitable inert (not interfering with the processes described herein) substituents on the aryl groups have Hammett sigma (para) values in the −0.5 to 0.8 range, and are other than hydroxyl, sulfhydryl, amino, alkylamino or dialkylamino groups. Representative substituents and their sigma values, (relative to H = 0.00), as given by Jaffe, Chem. Rev. 53, 219–233 (1953) are: methyl (−0.17), ethyl (−0.15), t-butyl (−0.20), phenyl (0.01), butoxy (−0.32), phenoxy (−0.03), fluoro (0.06), chloro (0.23), bromo (0.23), iodo (0.28), methylthio (−0.05), nitro (0.78), ethoxycarbonyl (0.52), and cyano (0.63). The foregoing substituents are preferred; however, other substituents which may be employed include trifluoromethyl (0.55), chloromethyl (0.18), carboxyl (0.27), cyanomethyl (0.01), 2-carboxyethyl (−0.07), and methylsulfonyl (0.73). Thus, the substituents may be halogen, cyano, lower hydrocarbyl (including alkyl, halo alkyl, cyanoalkyl, hydroxyalkyl and aryl), lower alkoxy, aryloxy, lower alkylthio, acylthio, sulfo, alkyl sulfonyl, arylsulfonyl, and nitro, and lower alkylcarbonyl. In the foregoing list, alkyl groups referred to therein are preferably of one to six carbon atoms; while aryl groups referred to therein are preferably of six to 10 carbon atoms.

Preferably the aryl radicals are carbocyclic, particularly phenyl, and the substituents have Hammett sigma values in the range −0.4 to +0.4, particularly lower alkyl, lower alkoxy, chloro, fluoro, bromo and benzo groups.

In the preferred hexaarylbiimidazole class, the 2 and 2' aryl groups are phenyl rings bearing an ortho substituent having a Hammett sigma value in the range −0.4 to +0.4. Preferred ortho substituents are fluorine, chlorine, bromine, methyl and methoxy groups, especially chloro. Such biimidazoles tend less than others to form color when the light-sensitive compositions are applied to and dried on substrates at somewhat elevated temperatures, e.g., in the range 70°–100° C.

Most preferably, the 2-phenyl ring carries only the above-described ortho group, and the 4- and 5-phenyl ring are either unsubstituted or substituted with lower alkoxy.

Preferred hexaarylbiimidazoles include 2,2'-bis(o-chlorophenyl-4,4'5,5'-tetraphenylbiimidazole and 2,2'-bis(o-chlorophenyl)-4,4',5,5'-(m-methoxyphenyl)biimidazole.

Representative hexaarylbiimidazoles which may be employed in this invention include:

2,2'-bis(o-bromophenyl)-4,4',5,5'-tetraphenylbiimidazole,
2,2'-bis(bromophenyl)-4,4',5,5'-tetraphenylbiimidazole,
2,2'-bis(p-carboxyphenyl)-4,4',5,5'-tetraphenylbiimidazole,
2,2'-bis(o-chlorophenyl)-4,4',5,5'-tetrakis(p-methoxyphenyl)-biimidazole,
2,2'-bis(o-chlorophenyl)-4,4',5,5'-tetraphenylbiimidazole,
2,2'-bis(p-chlorophenyl)-4,4',5,5'-tetrakis(p-methoxyphenyl)-biimidazole, 2,2′-bis(p-cyanophenyl)-4,4′,5,5′-tetrakis(p-methoxyphenyl)-biimidazole,
2,2′-bis(2,4-dichlorophenyl)-4,4′,5,5′-tetraphenylbiimidazole
2,2′-bis(2,4-dimethoxyphenyl)-4,4′,5,5′-tetraphenylbiimidazole
2,2′-bis(o-ethoxyphenyl)-4,4′,5,5′-tetraphenylbiimidazole,
2,2′-bis(m-fluorophenyl)-4,4′,5,5′-tetraphenylbiimidazole,
2,2′-bis(o-fluorophenyl)-4,4′,5,5′-tetraphenylbiimidazole,
2,2′-bis(p-fluorophenyl)-4,4′,5,5′-tetraphenylbiimidazole,
2,2′-bis(o-hexoxyphenyl)-4,4′,5,5′-tetraphenylbiimidazole,
2,2′-bis(o-hexylphenyl)-4,4′,5,5′ -tetrakis(p-methoxyphenyl)-biimidazole,
2,2′-bis(3,4-methylenedioxyphenyl)-4,4′,5,5′-tetraphenylbiimidazole,
2,2′-bis(o-chlorophenyl) 4,4′,5,5′-tetrakis(m-methoxyphenyl)biimidazole,
2,2′-bis(o-chlorophenyl)-4,4′,5,5′-tetrakis[m-(betaphenoxy-ethoxyphenyl)]biimidazole,
2,2′-bis(2,6-dichlorophenyl)-4,4′,5,5′-tetraphenylbiimidazole,
2,2′-bis(o-methoxyphenyl)-4,4′,5,5′-tetraphenylbiimidazole,
2,2′-bis(p-methoxyphenyl)-4,4′-bis(o-methoxyphenyl)-5,5′-diphenylbiimidazole,
2,2′-bis(o-nitrophenyl)-4,4′,5,5′-tetraphenylbiimidazole,
2,2′-bis(p-phenylsulfonylphenyl)-4,4′,5,5′-tetraphenylbiimidazole,
2,2′-bis(p-sulfamoylphenyl)-4,4′,5,5′-tetraphenylbiimidazole,
2,2′-bis(2,4,6-trimethylphenyl)-4,4′,5,5′-tetraphenylbiimidazole,
2,2′-di-4-biphenylyl-4,4′,5,5′-tetraphenylbiimidazole,
2,2′-di-1-naphthyl-4,4′,5,5′-tetrakis(p-methoxyphenyl)-biimidazole,
2,2′-di-9-phenanthryl-4,4′,5,5′-tetrakis(p-methoxyphenyl)-biimidazole,
2,2′-diphenyl-4,4′,5,5′-tetra-4-biphenylylbiimidazole,
2,2′-diphenyl-4,4′,5,5′-tetra-2,4-xylylbiimidazole,
2,2′-di-3-pyridyl-4,4′,5,5′-tetraphenylbiimidazole,
2,2′-di-3-thienyl-4,4′,5,5′-tetraphenylbiimidazole,
2,2′-di-o-tolyl-4,4′,5,5′-tetraphenylbiimidazole,
2,2′-di-p-tolyl-4,4′-di-o-tolyl-5,5′-diphenylbiimidazole,
2,2′-di-2,4-xylyl-4,4′,5,5′-tetraphenylbiimidazole,
2,2′,4,4′,5,5′-hexakis(p-benzylthiophenyl)biimidazole,
2,2′,4,4′,5,5′-hexa-1-naphthylbiimidazole,
2,2′,4,4′,5,5′-hexaphenylbiimidazole,
2,2′-bis(2-nitro-5-methoxyphenyl)-4,4′,5,5′-tetraphenylbiimidazole, and
2,2′-bis(o-nitrophenyl)-4,4′,5,5′-tetrakis(m-methoxyphenylbiimidazole.
2,2′-bis(2-chloro-5-sulfophenyl)-4,4′,5,5′-tetraphenylbiimidazole.

The hexaarylbiimidazoles are conveniently obtained by known methods as more particularly described by British Pat. No. 997,396 and by Hayashi et al., Bull. Chem. Soc. Japan, 33, 565 (1960) and Cescon & Dessauer Appln. Ser. No. 728,781, filed May 13, 1968, now U.S. Pat. No. 3,445,234. The preferred method, involving oxidative dimerization of the corresponding triarylimidazole with ferricyanide in alkali, generally yields the 1-2′-hexaarylbiimidazoles, although other isomers, such as the 1,1′,1,4′,2,2′,2,4′ and 4,4′-hexaarylbiimidazoles are sometimes also obtained admixed with the 1,2′-isomer. For the purposes of this invention, it is immaterial which isomer is employed so long as it is photodissociable to the triarylimidazolyl radical, as discussed above.

The Optional Leuco Dye

The leuco dye together with the hexaarylbiimidazole and the heterocyclic compound forms one embodiment of this invention. By the term "leuco dye" is meant the colorless (i.e., the reduced) form of a dye compound which may be oxidized to its colored form by the triarylimidazolyl radical.

Leuco dyes which may be oxidized to color by the triarylimidazolyl radicals generated from the compositions of this invention include: aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leuco methines), hydrazines, leuco indigoid dyes, amino-2,3-dihydroanthraquinones, tetrahalo-p,p′-biphenols, 2(p-hydroxyphenyl)-4,5-diphenylimidazoles, phenethylanilines, and the like. These classes of leuco dyes are described in greater detail in Cescon & Dessauer U.S. application Ser. No. 728,781, filed May 13, 1968, now U.S. Pat. No. 3,445,234; Cescon, Dessauer & Looney U.S. Pat. No. 3,423,427; Cescon, Dessauer & Looney U.S. application Ser. No. 290,583, filed June 26, 1963, now U.S. Pat. No. 3,449,379; Read U.S. Pat. No. 3,395,018 and Read U.S. Pat. No. 3,390,997.

The preferred leucos are the aminotriarylmethanes. Preferably the aminotriarylmethane is one wherein at least two of the aryl groups are phenyl groups having (a) an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio. Preferably the third aryl group is the same as the first two.

Particularly preferred aminotriarylmethanes have the following structural formula:

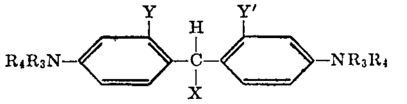

wherein $R_3$ and $R_4$ are selected from lower alkyl (preferably ethyl) or benzyl, Y and Y′ are lower alkyl (preferably methyl) and X is selected from

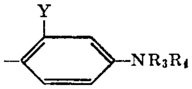

$NR_3R_4$, p-methoxyphenyl, 2-thienyl, phenyl, 1-naphthyl, 2,3-dimethoxyphenyl, 3,4-methylenedioxyphenyl, or p-benzylthiophenyl. Preferably X is selected from

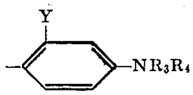

$NR_3R_4$, phenyl, 1-naphthyl, or p-benzylthiophenyl.

These triarylmethanes are employed as salts of strong acids: for example, mineral acids such as hydrochloric, hydrobromic, sulfuric, nitric, phosphoric; organic acids such as acetic, oxalic, p-toluenesulfonic, trichloroacetic acid, trifluoroacetic acid, perfluoroheptanoic acid; and Lewis acids such as zinc chloride, zinc bromide, and ferric chloride; the proportion of acid usually varying from 0.33 mole to 1 mole per amino group. The term "strong acid" as used herein is defined as an acid which forms a salt with an anilino amino group.

Specific examples of the aminotriarylmethanes employed in this invention are:

bis(4-amino-2-butylphenyl)(p-dimethylaminophenyl)methane
bis(4-amino-2-chlorophenyl)(p-aminophenyl)methane bis(4-amino-3-chlorophenyl)(o-chlorophenyl)methane
bis(4-amino-3-chlorophenyl)phenylmethane
bis(4-amino-3,5-diethylphenyl)(o-chlorophenyl)methane
bis(4-amino-3,5-diethylphenyl)(o-ethoxyphenyl)methane
bis(4-amino-3,5-diethylphenyl)(p-methoxyphenyl)methane
bis(4-amino-3,5-diethylphenyl)phenylmethane
bis(4-amino-3-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(p-aminophenyl)phenylmethane
bis(4-amino-o-tolyl)(p-chlorophenyl)methane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl)methane
bis(p-benzylethylaminophenyl)(p-chlorophenyl)methane
bis(p-benzylethylaminophenyl)(p-diethylaminophenyl)methane
bis(p-benzylethylaminophenyl)(p-dimethylaminophenyl)methane
bis(4-benzylethylamino-o-tolyl)(p-methoxyphenyl)methane
bis(p-benzylethylaminophenyl)-phenylmethane
bis(4-benzylethylamino-o-tolyl)(o-chlorophenyl)methane
bis(4-benzylethylamino-o-tolyl)(p-diethylaminophenyl)methane
bis(4-benzylethylamino-o-tolyl)(4-diethylamino-o-tolyl)methane
bis(4-benzylethylamino-o-tolyl)(p-dimethylaminophenyl)methane
bis[2-chloro-4-(2-diethylaminoethyl)ethylaminophenyl](o-chlorophenyl)methane
bis[p-bis(2-cyanoethyl)aminophenyl]phenylmethane
bis[p-(2-cyanoethyl)ethylamino-o-tolyl](p-dimethylaminophenyl)methane
bis[p-(2-cyanoethyl)methylaminophenyl](p-diethylaminophenyl)methane
bis(p-dibutylaminophenyl)[p-(2-cyanoethyl)methylaminophenyl]methane
bis(p-dibutylaminophenyl)(p-diethylaminophenyl)methane
bis(4-diethylamino-2-butoxyphenyl)(p-diethylaminophenyl)methane
bis(4-diethylamino-2-fluorophenyl)o-tolylmethane
bis(p-diethylaminophenyl)(p-aminophenyl)methane
bis(p-diethylaminophenyl)(4-anilino-1-naphthyl)methane
bis(p-diethylaminophenyl)(m-butoxyphenyl)methane
bis(p-diethylaminophenyl)(o-chlorophenyl)methane
bis(p-diethylaminophenyl)(p-cyanophenyl)methane
bis(p-diethylaminophenyl)(2,4-dichlorophenyl)methane
bis(p-diethylaminophenyl)(4-diethylamino-1-naphthyl)methane
bis(p-diethylaminophenyl)(p-dimethylaminophenyl)methane
bis(p-diethylaminophenyl)(4-ethylamino-1-naphthyl)methane
bis(p-diethylaminophenyl)2-naphthylmethane
bis(p-diethylaminophenyl)(p-nitrophenyl)methane
bis(p-diethylaminophenyl)2-pyridylmethane
bis(p-diethylamino-m-tolyl)(p-diethylaminophenyl)methane
bis(4-diethylamino-o-tolyl)(o-chlorophenyl)methane
bis(4-diethylamino-o-tolyl)(p-diethylaminophenyl)methane
bis(4-diethylamino-o-tolyl)(p-diphenylaminophenyl)methane
bis(4-diethylamino-o-tolyl)phenylmethane
bis(4-dimethylamino-2-bromophenyl)phenylmethane
bis(p-dimethylaminophenyl)(4-anilino-1-naphthyl)methane
bis(p-diemthylaminophenyl)(p-butylaminophenyl)methane
bis(p-dimethylaminophenyl)(p-sec. butylethylaminophenyl)methane
bis(p-dimethylaminophenyl)(p-chlorophenyl)methane
bis(p-dimethylaminophenyl)(p-diethylaminophenyl)methane
bis(p-dimethylaminophenyl)(4-dimethylamino-1-naphthyl)methane
bis(p-dimethylaminophenyl)(6-dimethylamino-m-tolyl)methane
bis(p-dimethylaminophenyl)(4-dimethylamino-o-tolyl)methane
bis(p-dimethylaminophenyl)(4-ethylamino-1-naphthyl)methane
bis(p-dimethylaminophenyl)(p-hexyloxyphenyl)methane
bis(p-dimethylaminophenyl)(p-methoxyphenyl)methane
bis(p-dimethylaminophenyl)(5-methyl-2-pyridyl)methane
bis(p-dimethylaminophenyl) 2-quinolylmethane
bis(p-dimethylaminophenyl) o-tolylmethane
bis(p-dimethylaminophenyl)(1,3,3-trimethyl-2-indolinylidedemethyl)methane
bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl)(o-fluorophenyl)methane
bis(4-dimethylamino-o-tolyl) 1-naphthylmethane
bis(4-dimethylamino-o-tolyl)phenylmethane
bis(p-ethylaminophenyl)(o-chlorophenyl)methane
bis(4-ethylamino-m-tolyl)(o-methoxyphenyl)methane
bis(4-ethylamino-m-tolyl)(p-methoxyphenyl)methane
bis(4-ethylamino-m-tolyl)(p-dimethylaminophenyl)methane
bis(4-ethylamino-m-tolyl)(p-hydroxyphenyl)methane
bis[4-ethyl(2-hydroxyethyl)amino-m-tolyl](p-diethylaminophenyl)methane
bis[p-(2-hydroxyethyl)aminophenyl](o-chlorophenyl)methane
bis[p-(bis(2-hydroxyethyl)aminophenyl](4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane
tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4-diethylamino-2-fluorophenyl)methane
tris(4-dimethylamino-2-fluorophenyl)methane
bis(2-bromo-4-diethylaminophenyl)phenylmethane,
bis(2-butoxy-4-diethylaminophenyl)phenylmethane,
bis(4-diethylamino-o-tolyl)(p-methoxyphenyl)methane,
bis(4-diethylamino-2-methoxyphenyl)(p-nitrophenyl)methane,
bis(4-diethylamino-1-naphthyl)(4-diethylamino-o-tolyl)methane,
bis(4-diethylamino-o-tolyl)1-naphthylmethane,
bis(4-diethylamino-o-tolyl)phenylmethane,
tris(4-dimethylamino-2-chlorophenyl)methane,
bis(4-dimethylamino-2,5-dimethylphenyl)phenylmethane,
bis(4-dimethylamino-o-tolyl)(o-bromophenyl)methane,
bis(4-ethylbenzylamino-o-tolyl)(p-methoxyphenyl)methane,
tris(p-dioctylamino-o-tolyl)methane, bis(4-diethylamino-o-tolyl)(4-methoxy-1-naphthyl) methane
bis(4-diethylamino-o-tolyl)(3,4,5-trimethoxyphenyl) methane
bis(4-diethylamino-o-tolyl)(p-hydroxyphenyl) methane
5-[bis(4-diethylamino-o-tolyl)-methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4-[bis(4-diethylamino-o-tolyl)-methyl]-phenylmethyl sulfone
4-[bis(4-diethylamino-o-tolyl)-methyl]-methylsulfonanilide
4-[bis(4-diethylamino-o-tolyl)-methyl]-p-tolylsulfonanilide
bis(4-diethylamino-o-tolyl)-p-nitrophenyl methane
bis(4-diethylamino-o-tolyl)(2-diethylamino-4-methyl-5-thiazolyl) methane
bis(4-diethylamino-o-tolyl)(2-diethylamino-5-methyl-6-benzoxazolyl) methane
bis(4-diethylamino-o-tolyl)(2-diethylamino-5-methyl-6-benzothiazolyl) methane
bis(4-diethylamino-o-tolyl)(1-ethyl-2-methyl-3-indolyl) methane
bis(4-diethylamino-o-tolyl)(1-benzyl-2-methyl-3-indolyl) methane
bis(4-diethylamino-o-tolyl)(1-ethyl-2-methyl-5-methoxyl-3-indolyl)methane
bis(1-o-xylyl-2-methyl-3-indolyl)(4-diethylamino-o-tolyl)methane
bis(4-diethylamino-o-tolyl)(1-ethyl-5-indolinyl)methane
bis(1-isobutyl-6-methyl-5-indolinyl)(4-diethylamino-o-tolyl)methane
bis(4-diethylamino-o-tolyl)(8-methyl-9-julolindinyl)methane
bis(4-diethylamino-2-acetamidophenyl)(4-diethylamino-o-tolyl) methane
4-[bis(4-diethylamino-o-tolyl)methyl]-N-ethylacetanilide
bis[4-(1-phenyl-2,3-dimethyl-5-pyrazolinyl)](4-diethylamino-o-tolyl)methane
bis(4-diethylamino-o-tolyl)(7-diethylamino-4-methyl-3-coumarinyl)methane
bis(4-diethylamino-o-tolyl)(4-acrylamidophenyl)methane
bis(4-diethylamino-o-tolyl)(p-benzylthiophenyl)methane
bis(4-diethylamino-o-tolyl)(4-isopropylthio-3-methylphenyl)methane
bis(4-diethylamino-o-tolyl)(4-chlorobenzylthiophenyl)methane
bis(4-diethylamino-o-tolyl)(2-furyl)methane
bis(4-diethylamino-o-tolyl)(3,4-methylenedioxyphenyl)methane
bis(4-diethylamino-o-tolyl)(3,4-dimethoxyphenyl)methane
bis(4-diethylamino-o-tolyl)(3-methyl-2-thienyl)methane
bis(4-diethylamino-o-tolyl)(2,4-dimethoxyphenyl)methane
bis[4-(2-cyanoethyl)(2-hydroxyethyl)amino-o-tolyl]-(p-benzylthiophenyl)methane,
bis[4-(2-cyanoethyl)(2-hydroxyethyl)amino-o-tolyl]-2-thienylmethane,
bis(4-dibutylamino-o-tolyl)2-thienylmethane,
bis(4-diethylamino-2-ethylphenyl)(3,4-methylenedioxyphenyl)methane,
bis(4-diethylamino-2-fluorophenyl)(p-benzylthiophenyl)methane,
bis(4-diethylamino-2-fluorophenyl)(3,4-methylenedioxyphenyl)methane,
bis(4-diethylamino-o-tolyl)(p-methylthiophenyl)methane,
bis(4-diethylamino-o-tolyl)2-thienylmethane,
bis(4-dimethylamino-2-hexylphenyl)(p-butylthiophenyl)methane,
bis[4-(N-ethylanilino)-o-tolyl](3,4-dibutoxyphenyl)methane,
bis[4-bis(2-hydroxyethyl)amino-2-fluorophenyl](p-benzylthiophenyl)methane,
bis(4-diethylamino-o-tolyl)-p-chlorophenyl methane,
bis(4-diethylamino-o-tolyl)-p-bromophenyl methane,
bis(4-diethylamino-o-tolyl)-p-fluorophenyl methane,
bis(4-diethylamino-o-tolyl)-p-tolyl methane,
bis(4-diethylamino-o-tolyl)-4-methoxy-1-naphthyl methane,
bis(4-diethylamino-o-tolyl)-3,4,5-trimethoxyphenyl methane,
bis(4-diethylamino-o-tolyl)-p-hydroxyphenyl methane,
bis(4-diethylamino-o-tolyl)-3-methylthienyl methane.

Preparation of Compositions and Other Components

The hexaarylbiimidazole and heterocyclic compound sensitizer are conveniently carried in an inert common solvent in proportions recited above and in amounts providing at least about 0.5 percent by weight of the hexaarylbiimidazole. To provide color-forming or imaging compositions, one or more leuco dyes as defined above are added, usually in amounts providing from 0.1 to 10 moles of leuco dye per mole of hexaarylbiimidazole, more usually from 0.5 to 2 moles and preferably about 1 mole, per mole of hexaarylbiimidazole. Still other components may be present as described further below.

Solvents

In general, solvents are employed which are volatizing at ordinary pressures. Examples are amides such as N,N-dimethylformamide and N,N-dimethylacetamide; alcohols and ether alcohols such as methanol, ethanol, 1-propanol, 2-propanol, butanol, and ethylene glycol; esters such as methyl acetate and ethyl acetate; aromatics such as benzene, o-dichlorobenzene, toluene; ketones such as acetone, methyl ethyl ketone, 3-pentanone; aliphatic halocarbons such as methylene chloride, chloroform, 1,1,2-trichloroethane, 1,1,2,2-tetrachloroethane, 1,1,2-trichloroethylene; miscellaneous solvents such as dimethylsulfoxide, pyridine, tetrahydrofuran, dioxane, dicyanocyclobutane, 1-methyl-2-oxohexamethyieneimine; and mixtures of these solvents in various proportions as may be required to attain solutions.

In imaging uses such solvents provide a fluid medium for convenient application of the light-sensitive composition to substrates. To obtain the final coated article the solvent is normally removed as, e.g., by evaporation. It is often beneficial to leave a small residue of solvent in the dried composition so that the desired degree of imaging can be obtained upon subsequent irradiation. Ordinary drying such as that employed in paper manufacture or in film casting results in the retention of ample solvent to give a composition with good photosensitivity. The compositions so produced are dry to the touch and stable to storage at room temperature. Indeed, moisture of the air is absorbed by many of the compositions, particularly those comprising an acid salt of an amino leuco form of a dye on cellulosic substrates, and serves as a suitable solvent.

Binders

Polymeric binders may also be present in the light-sensitive compositions to thicken them or adhere them to substrates. Binders can also serve as a matrix for the color-forming composition and the mixture may be cast, extruded or otherwise formed into unsupported imageable films. Light-transparent and film-forming polymers, are preferred. Examples are ethyl cellulose, polyvinyl alcohol, polyvinyl chloride, polystyrene, polyvinyl acetate, poly(methyl me,hacrylate), cellulose acetate, cellulose butyrate, cellulose acetate butyrate, cellulose nitrate, chlorinated rubber, copolymers of the above vinyl monomers, and gelatin. Binder or matrix amounts vary from about 0.5 part to about 200 parts by weight per part of combined weight of the composition. In general, from 0.5 to 10 parts are used as adhesive or thickener, while higher amounts are used to form the unsupported films. With certain polymers, it may be desirable to add a plasticizer to give flexibility to the film or coating. Plasticizers include the polyethylene glycols such as the commercially available Carbowaxes, and related materials, such as substituted phenol-ethylene oxide adducts, for example the polyethers obtained from o-, m- and p-cresol, o-, m- and p-phenylphenol and p-nonylphenol, including commercially available materials such as the Igepal alkyl phenoxy polyoxyethylene ethanols. Other plasticizers are the acetates, propionates, butyrates and other carboxylate esters of ethylene glycol, diethyleneglycol, glycerol, pentaerythritol and other polyhydric alcohols, and alkyl phthalates and phosphates such as dimethyl phthalate, diethyl phthalate, dioctyl phthalate, tributyl phosphate, trihexyl phosphate, trioctyl phosphate, triphenyl phosphate, tricresyl phosphate and cresyl diphenyl phosphate.

Other Sensitizers

The spectral sensitivity of the hexaarylbiimidazoles may be extended further to visible light by also incorporating into the above-described compositions a visible-light-absorbing energy-transferring agent such as Erythrosin B, Rose Bengal or other phthalein dye disclosed in Walker, U.S. Ser. No. 654,720, filed July 20, 1967, now U.S. Pat. No. 3,563,750; Acridine Orange, Diethyl Orange or other aminoacridine dye disclosed in Cohen, U.S. Ser. No. 654,721, filed July 20, 1967, now U.S. Pat. No. 3,563,751; 3,3′-diethyl-4,5,4,5′-dibenzoxacarbocyanine p-toluene sulfonate, 3,3′-diethyloxaselenacarbocyanine iodide, 3,3′-di-n-butyl-9-methylthiacarbocyanine iodide, 3,3′-diethylthiaselenacarbocyanine iodide, 3,3′-diethylselenacarbocyanine iodide, or the like carbocyanine dye disclosed in Cohen, U.S. application Ser. No. 654,676, filed July 20, 1967, now U.S. Pat. No. 3,554,753; or 7-diethylamino-4-methylcoumarin, 7-dimethylamino-4-methylcoumarin, or the like coumarin disclosed in James & Witterholt, U.S. Ser. No. 622,526, filed Mar. 13, 1967, now U.S. Pat. No. 3,533,797, said applications being assigned to the assignee herein.

Substrates

For imaging uses, the compositions of this invention may natural coated upon or impregnated in substrates following known techniques. Substrates include materials commonly used in the graphic arts and in decorative applications such as paper ranging from tissue paper to heavy cardboard, films of plastics and polymeric materials such as regenerated cellulose, cellulose acetate, cellulose nitrate, polyester of glycol and terephthalic acid, vinyl polymers and copolymers, polyethylene, polyvinylacetate, polymethyl methacrylate, polyvinylchloride; textile fabrics; glass, wood and metals. The composition, usually as a solution in a carrier solvent described above may be sprayed, brushed, applied by a roller or an immersion coater, flowed over the surface, picked up by immersion or spread by other means, and the solvent evaporated.

Light Sources

Any convenient source providing wavelengths in the ultraviolet and visible region of the spectrum that overlap the heterocyclic sensitizer's absorption bands may be used to activate the light-sensitive compositions for triarylimidazolyl radical formation and image formation. The light may be natural or artificial, monochromatic or polychromatic, incoherent or coherent, and for high efficiency should correspond closely in wavelengths to the heterocyclic sensitizer's principal absorption bands and should be sufficiently intense to activate a substantial proportion of the sensitizer. Also it may often be advantageous to increase the speed of triarylimidazolyl radical and image formation by employing the longer wavelength light range in accord with this invention in conjunction with the ultraviolet light range normally required to dissociate the dimer.

Conventional light sources include fluorescent lamps, mercury, metal additive and arc lamps providing narrow or broad light bands centered near 360, 420, 450 and 500 $\mu$ wavelengths. Coherent light sources are the pulsed nitrogen-, argon ion- and ionized neon-lasers whose emissions fall within or overlap the ultraviolet or visible absorption bands of the sensitizer.

Ultraviolet and visible emitting cathode-ray tubes widely useful in printout systems for writing on photosensitive materials are also useful with the subject compositions. These in general involve an ultraviolet or visible-emitting phosphor internal coating as the means for converting electrical energy to light energy and a fiber optic face plate as the means for directing the radiation to the photosensitive target. Representative phosphors that emit strongly and substantially overlap the near ultraviolet-absorption and visible absorption characteristics of the subject compositions include the P4B (emitting at 300–550 $\mu$, peaking at 410 $\mu$) P16 (330–460 $\mu$, peaking at 380 $\mu$) and P22B (390–510 $\mu$, peaking at 450 $\mu$) types. Other phosphors which may be used are the P11 (400–560 $\mu$, peaking at 460 $\mu$) and $ZrP_2O_7$ types. (The Electronic Industries Association, New York, New York, assigns P-numbers and provides characterizing information on the phosphors; phosphors with the same P-number have substantially identical characteristics.)

Images may be formed by writing with a beam of the activating light or by exposing to such light a selected area behind a negative, stencil, or other relatively opaque pattern. The negative may be silver on cellulose acetate or polyester film or one in which its opacity results from aggregations of areas having different refractive indices. Image formation may also be effected in conven,ional diazo printing apparatus, or in a thermography device, provided the instrument emits some of its light in the desired wavelength range. A piece of onionskin paper which bears typewriting, for example, can serve as a master from which copies are made. The light exposure time may vary from a fraction of a second to several minutes, depending upon the intensity and spectral energy distribution of the light, its distance from the composition, the nature and amount of the composition available, and the intensity of color in the image desired.

Photopolymerizable Compositions

Another embodiment of this invention is a photopolymerizable composition comprising the hexaarylbiimidazole/heterocyclic compound sensitizer combination as defined above and an addition-polymerizable ethylenically unsaturated compound. Such composition may include one or more other ingredients such as a carrier solvent or a binder as described above, or a polymerization aid such as an electron-donating free radical generator as disclosed in Belgian Pat. No. 681,944.

The addition-polymerizable component includes low and high molecular weight compounds, including polymeric compounds, which have at least one polymerizable ethylenic group, preferably a terminal $CH_2=C$ group, free to polymerize. Thus this component may be a relatively simple monomer or it may be a polymer having cross-linkable ethylenic groups. Normally its molecular weight is below about 1,500 and it contains two or more ethylenic, particularly vinylic groups, for cross-linking. Preferred monomers are the terminally unsaturated carboxylic ester monomers, particularly alpha-methylene carboxylic acid esters of polyols, e.g., ethylene glycol diacrylate, diethylene glycol diacrylate, triethylene glycol diacrylate, glycerol diacrylate, glycerol triacrylate, ethylene glycol dimethacrylate 1,2-propanediol dimethacrylate, 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,5-pentanediol dimethacrylate, pentaerythritol triacrylate; the bisacrylates and methacrylates of polyethylene glycols of molecular weight 100–500, and the like.

The addition-polymerizable component will ordinarily be present in an amount of 10 to 100 moles/mole of hexaarylbiimidazole, and more usually 15–25 moles/mole. With these latter proportions, a plasticizer, usually 10–50 percent by weight based on weight of monomer, may be employed.

Preferred photopolymerizable compositions of this invention also include as polymerization aid or coinitiator a photooxidizable amine such as triethanolamine, N-phenyl glycine, N,N-diethylaniline, N,N-dimethylglycine, tri-n-hexylamine, dimethyl cyclohexylamine, diethylcyclohexylamine, N,N,N′,N′-tetramethylethylene diamine, tetramethylethylene diamine, 2-dimethylaminoethanol, 3-dimethylamino-1-propanol, 2-diethanolamine or any aminotriarylmethane leuco dye, particularly those containing dialkylamino groups, described above as useful herein as color generators, in an amount described for the leuco dye.

With an aminotriarylmethane leuco dye present in a color-forming amount, the photopolymerizable compositions are capable of forming color as well as polymer on being irradiated according to the method of the invention. The polymerization rate may often be speeded up by employing another free radical generator or chain transfer agent, in amount ranging from 0.01 to 0.1 mole/mole leuco dye, such as N-phenylglycine, 1,1-dimethyl-3,5-diketocyclohexane, or organic thiols, e.g., 2-mercaptobenzothiazole, 2-mercaptobenzoxazole, 2-mercaptobenzimidazole, pentaerythritol tetrakis(mercaptoacetate), 4-acetamidothiophenol, mercaptosuccinic acid, dodecanethiol, beta-mercaptoethanol, or other organic thiol.

Through exposure control, e.g., by altering the intensity and time of exposure, as more fully described in Cescon, Cohen & Dessauer, U.S. Ser. No. 740,103, filed June 26, 1968 and assigned to the assignee herein, the color-forming and polymerization reactions can be controlled so as to produce substantially colored or uncolored compositions. Thus polymerization fixed images can be produced in imaging applications by sequentially applied exposures that substantially completely polymerize the composition while controlling the amount of color produced in adjacent areas.

The following examples illustrate the invention embodiments in greater detail:

Examples 1–2

The following sensitized imaging formulation was prepared as a coating composition in acetone (a convenient carrier solvent). The sensitizer, 2,5-diphenylfuran, absorbs maximally at 330 μ with a 33,800 extinction coefficient.

| Ingredient | Parts by Weight |
|---|---|
| Acetone | 46.0 |
| Cellulose acetate butyrate (a thermoplastic resin binder) | 6.0 |
| p-Phenylphenol/5.9 moles ethylene oxide adduct (i.e., $C_6H_5C_6H_4O(CH_2CH_2O)_5 \cdot {}_9H$ (plasticizer) | 4.0 |
| 2,2'-bis(o-chlorophenyl)-4,4',5,5'-tetrakis(m-methoxyphenyl) biimidazole | 0.62 |
| tris(p-N,N-diethylamino-o-tolyl) methane (leuco dye) | 0.30 |
| p-Toluenesulfonic acid | 0.34 |
| 2,5-diphenylfuran | as given below |

The solution was applied to bleached-sulfite roll stock paper and the acetone allowed to evaporate to give a 0.5-mil thick coating. A solution identical to the above but without sensitizer was similarly coated on paper for comparison. The coated papers were exposed to light from a Xenon lamp filtered through a 7-54 cutoff filter which transmits between 250 and 350 μ.

During the exposure the optical density of the color developed was monitored with a MacBeth Reflectance Quantometer. The results are expressed below as the increase in color-forming speed for the sensitized over the unsensitized (control) formulation, with speed defined as 1,000 times the reciprocal of the exposure required to develop a 0.3 reflectance optical density.

| 2,5-Diphenylfuran Amount, gram | Color-forming speed increase over unsensitized control |
|---|---|
| 0.04 | 30% |
| 0.20 | 90% |

In separate experiments it was found that when the hexaarylbiimidazole or the leuco dye were omitted, essentially no color formation was observed. Thus the results demonstrate the sensitized hexaarylbiimidazole photolysis and subsequent leuco dye oxidation at the indicated wavelengths.

Examples 3–5

The procedure of Examples 1–2 was repeated with 0.4 gram of 2,5-diphenyloxazole (305 μ absorption maximum with 29,500 extinction coefficient) in place of the furan in one composition (Example 3) with 0.4 gram of 2-phenyl-5-(alphanaphthyl)oxazole (333 μ absorption maximum with 22,500 extinction coefficient) as the sensitizer in a second composition (Example 4), and with 0.08 gram of 1,4-bis[2-(5-phenyl-oxazolyl)]benzene (360 μ absorption maximum with 54,200 extinction coefficient) in a third composition (Example 5).

The resulting coated papers were 80 percent (Example 3), 50 percent (Example 4) and about 200 percent (Example 5) faster than the unsensitized control in color-forming speed.

Examples 6–10

The procedure of Examples 1–2 was repeated with a 2,5-diaryl-1,3,4-oxadiazole, as shown below, replacing 2,5-diphenylfuran as the sensitizer:

| Example | 1,3,4-oxadiazole | Amount, g. | % Speed Increase |
|---|---|---|---|
| 6 | 2-phenyl-5-(alpha-naphthyl) 316 mμ abs. max., ε=22,000 | 0.2 | 15 |
| 7 | 2,5-di(alpha-naphthyl) 330 mμ abs. max., ε=24,000 | 0.1 | 15 |
| 8 | 24,000 | 0.2 | 45 |
| 9 | 24,000 | 0.4 | 60 |
| 10 | 2-phenyl-5-(4-biphenylyl) 295 mμ abs. max., ε=42,700 | 0.2 | 40 |

Example 11

Sensitized Photopolymerization

The following solutions A and B were prepared:

| | Solution A | Solution B |
|---|---|---|
| poly(methyl methacrylate/methacrylic acid) 90/10 | 5.0 g. | 5.0 g. |
| Mixture of Octanoic acid and decanoic acid ester of triethylene glycol | 0.6 g. | 0.6 g. |
| Trimethylolpropane triacrylate | 1.9 g. | 1.9 g. |
| 2-(o-chlorophenyl)-4,5-dimethoxyphenyl imidazolyl dimer | 0.175 g. | 0.175 g. |
| Tris-(p-diethylamino-o-tolyl)-methane | 1.150 g. | 0.150 g. |
| 1,4-Bis(5-phenyloxazol-2-yl)-benzene | – | 0.041 g. |
| ethyl cellosolve (ethoxyethanol) to | 35.0 g. | 35.0 g. |

The resulting solutions were coated on brush-grained aluminum with a 2-mil doctor knife. The coatings were dried in a 116° C. oven for one minute and then overcoated with the following composition C and dried for 4 minutes in the same oven:

| Composition C | |
|---|---|
| polyvinyl pyrrolidone (MW 30,000) | 90.0 g. |
| Polyvinyl alcohol (medium viscosity 88% saponified) | 60.0 g. |
| 2-Ethoxyethanol | 45.0 ml. |
| Ethanol | 45.0 ml. |
| Surfactant (isooctyl phenyl polyethoxy-ethanol 10% by wt. aqueous) | 15.0 ml. |
| Distilled water to | 1142.0 g. |

The resulting aluminum plates were exposed through a negative (21 $\sqrt{2}$ step Graphic Arts Technical Foundation exposure wedge) in a vacuum with a carbon arc (B- 1C constant arc –140 ampere. No. 1112-Ld 612 Macbeth Arc Lamp Co., Philadelphia, Pennsylvania) for 15 seconds at a distance 56 inches. The plates were developed by washing out the unexposed parts of the coatings using a solution of the following composition D:

Composition D

| | |
|---|---|
| Trisodium phosphate ($Na_3PO_4$-12 $H_2O$) | 25.0 g. |
| Sodium phosphate (monobasic $NaH_2PO_4$-$H_2O$) | 4.4 g. |
| 2-Butoxyethanol | 55.0 g. |
| Isooctyl phenyl polyethoxyethanol (10% by weight aqueous) | 2.0 g. |
| Distilled water to | 1 liter |
| pH adjusted to 11.0 ± 0.1. | |

An exposure of 15 seconds gave an image of 8 $\sqrt{2}$ steps for coating from solution A and 11 $\sqrt{2}$ steps for coating from solution B indicating that 1,4-Bis(5-phenyloxazol-2-yl) benzene is a sensitizer for biimidazole leuco dye initiated photopolymerization system.

The exposed area of both plates readily accepted greasy or lipophilic ink. The analysis of the halftone dots showed the presence of good quality of 2 percent dots in the highlight areas and 98 percent dots in the shadow areas. The plates were treated with an aqueous gum arabic solution in the conventional manner before being placed on a wet offset printing press. Conventional offset printing ink and fountain solution were used. Printing quality was excellent.

The preceding representative Examples may be varied within the scope of the present total specification disclosure, and understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A photoactivatible composition comprising an admixture of

A. a hexaarylbiimidazole that has its principal light absorption bands in the ultraviolet region of the electromagnetic radiation spectrum and is dissociable to triarylimidazolyl radicals on irradiation with such absorbable ultraviolet light, and B. a heterocyclic compound of the formula $Ar^1$-G-$Ar^2$ wherein $Ar^1$ is an aryl group of six to 12 nuclear carbon atoms, $Ar^2$ is an aryl group of six to 12 nuclear carbon atoms or an arylene-G-$Ar^1$ group wherein arylene is of six to 10 carbon atoms, and G is a divalent furan, oxazole or oxadiazole ring, and which has its principal light absorption in the near ultraviolet or visible regions of the electromagnetic radiation spectrum, said heterocyclic compound being present in a sensitizing amount.

2. The composition of claim 1 wherein the hexaarylbiimidazole absorbs maximally in the 255–175 mμ region of the electromagnetic radiation spectrum, and wherein the heterocyclic compound absorbs substantially in the 290–420 mμ region of the electromagnetic radiation spectrum.

3. The composition of claim 2 wherein the hexaarylbiimidazole is a 2,2′, 4,4′, 5,5′-hexaphenylbiimidazole in which the phenyl groups can contain substituents which do not interfere with the photodissociation of the hexaarylbiimidazole and which have Hammett sigma values in the −0.5 to 0.8 range; and wherein the heterocyclic compound is represented by the formula

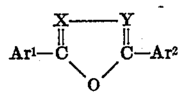

wherein X and Y are each individually selected from C—H, C—$CH_3$, C—$CH_2CH_3$, or N, and wherein $Ar^1$ is phenyl, biphenylyl or naphthyl, any one of which may be substituted with lower alkyl, lower aralkyl or lower alkylaralkyl.

4. The composition of claim 3 wherein the phenyl groups of the 2,2′, 4,4′, 5,5′-hexaphenylbiimidazole can contain substituents selected from lower alkyl, lower alkoxy, chloro, fluoro, bromo and benzo; and wherein in the formula of the heterocyclic compound the group

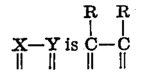

where R is hydrogen or alkyl of one or two carbon atoms,

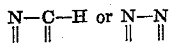

and wherein $Ar^1$ is phenyl, biphenylyl or naphthyl.

5. The composition of claim 4 wherein the 2 and 2′ phenyl groups of the hexaarylbiimidazole each contain an ortho substituent selected from lower alkyl, lower alkoxy, chloro, fluoro or bromo and wherein the 4,4′, 5, and 5′ phenyl groups of the hexaarylbiimidazole are either unsubstituted or contain up to three lower alkoxy groups each; and wherein the heterocyclic compound is selected from 2,5-diphenylfuran, 2,5-diphenyloxazole, 2-phenyl-5-(alpha-naphthyl)oxazole, 1,4-bis[2-(5, -phenyloxazoyl)]benzene, 2-phenyl-5-(alpha-naphthyl)oxadiazole, 2,5-di(alpha-naphthyl)oxadiazole or 2-phenyl-5-(4-biphenylyl)oxadiazole.

6. The composition of claim 5 wherein the hexaarylbiimidazole is selected from 2,2′-bis(o-chlorophenyl)-4,4′, 5,5′-tetraphenylbiimidazole or 2,2′-bis-(o-chlorophenyl)4,4′, 5,5′-(m-methoxyphenyl)biimidazole, and wherein the heterocyclic compound is 2,5-diphenylfuran.

7. The composition of claim 2 containing, additionally, (C) a leuco dye that is oxidizable to dye by triarylimidazolyl radicals.

8. The composition of claim 3 containing, additionally, (C) a leuco dye that is oxidizable to dye by triarylimidazolyl radicals which is selected from aminotriarylmethanes, aminoxanthanes, aminothioxanthenes, amino-9,10-dihydroacridines, aminophenoxazines, aminophenothiazines, aminodihydrophenazines, aminodiphenylmethanes, leuco indamines, aminohydrocinnamic acids, hydrazines, leuco indigoid dyes, amino-2,3-dihydroanthraquinones, tetrahalo-p,p′-biphenols, 2(p-hydroxyphenyl)-4,5-diphenylimidazoles, or phenethylanilines.

9. The composition of claim 4 containing, additionally, (C) a strong acid salt of an aminotriarylmethane leuco dye wherein at least two of the aryl groups are phenyl groups having (a) an $R_1R_2N$-substituent in the position para to the bond to the methane carbon wherein $R_1$ and $R_2$ are each selected from the class consisting of hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio.

10. The composition of claim 5 containing, additionally (C) a strong acid salt of an aminotriarylmethane leuco dye having the structural formula

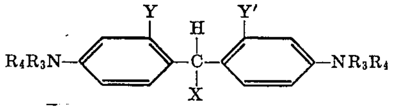

wherein $R_3$ and $R_4$ are each lower alkyl or benzyl, Y and Y' are lower alkyl and X is

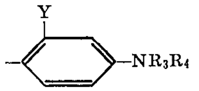

p-methoxyphenyl, 2-thienyl, phenyl, 1-naphthyl, 2,3-dimethoxyphenyl, 3,4-methylenedioxyphenyl, or benzylthiophenyl.

11. The composition of claim 6 which contains, additionally, a leuco dye selected from the p-toluenesulfonic acid salt of tris(p-N,N-diethylamino-o-tolyl)methane, or an equimolar mixture of the p-toluene sulfonic acid salts of bis(p-N,N-diethylamino-o-chlorophenyl) (p-chlorophenyl)methane and bis(p-N,N-diethylamino-o-tolyl)(p-isopropylthio-m-tolyl)methane.

12. The composition of claim 2 which contains, additionally, an addition-polymerizable, ethylenically unsaturated compound having at least one polymerizable ethylenic group, a photooxidizable amine and, optionally, a chain transfer agent.

13. The composition of claim 3 which contains, additionally, an addition-polymerizable, ethylenically unsaturated compound selected from terminally unsaturated carboxylic ester monomers, a photooxidizable amine, and optionally, a chain transfer agent selected from N-phenylglycine, 1,1-dimethyl-3,5-diketocyclohexane or an organic thiol.

14. The composition of claim 5 which contains additionally an addition-polymerizable, ethylenically unsaturated compound selected from terminally unsaturated carboxylic ester monomers, a photooxidizable amine selected from a strong acid salt of an aminotriarylmethane leuco dye having the structural formula

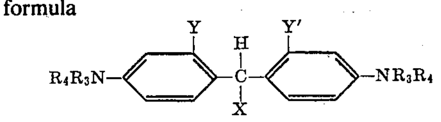

wherein $R_3$ and $R_4$ are each lower alkyl or benzyl, Y and Y' are lower alkyl and X is

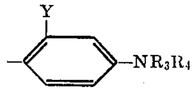

p-methoxyphenyl, 2-thienyl, phenyl, 1-naphthyl, 2,3-dimethoxyphenyl, 3,4-methylenedioxyphenyl, or benzylthiophenyl, and optionally, a chain transfer agent selected from N-phenylglycine, 1,1-dimethyl-3,5-diketocyclohexane or an organic thiol.

15. The composition of claim 11 which contains additionally, trimethylolpropane triacrylate.

16. Process of irradiating the composition of claim 2 with light having wavelengths within the range of the absorption bands of the heterocyclic compound.

17. Process for imaging which comprises irradiating the composition of claim 7 with a color-forming dosage of light having wavelengths within the range of the absorption bands of the heterocyclic compound.

18. Process for polymerization which comprises irradiating the composition of claim 12 with light having wavelengths within the range of the absorption bands of the heterocyclic compound.

19. Process for imaging and polymerization which comprises irradiating the composition of claim 14 with light having a wavelength within the range of the absorption bands of the heterocyclic compound and an intensity sufficient to simultaneously produce a colored polymerized composition.

20. The composition of claim 1 coated on a plastic film.

21. The composition of claim 7 coated on a plastic film.

22. The composition of claim 9 coated on a plastic film.

23. The composition of claim 12 coated on a plastic film.

24. The composition of claim 14 coated on a plastic film.

25. The composition of claim 1 coated on paper.

26. The composition of claim 7 coated on paper.

27. The composition of claim 9 coated on paper.

28. The composition of claim 12 coated on paper.

29. The composition of claim 14 coated on paper.

30. A composition comprising the composition of claim 1 and an inert solvent.

31. A composition comprising the composition of claim 7 and an inert solvent.

32. A composition comprising the composition of claim 9 and an inert solvent.

33. A composition comprising the composition of claim 12 and an inert solvent.

34. A composition comprising the composition of claim 14 and an inert solvent.

35. The composition of claim 1 wherein the heterocyclic compound has an extinction coefficient of at least 15,000 in the 290–400 m$\mu$ region of the electromagnetic spectrum.

* * * * *